US012358445B2

(12) United States Patent
Robertson

(10) Patent No.: US 12,358,445 B2
(45) Date of Patent: Jul. 15, 2025

(54) VEHICLES, VEHICLE ELECTRONICS SYSTEMS, AND METHODS

(71) Applicant: Toyota Motor Engineering & Manufacturing North America, Inc., Plano, TX (US)

(72) Inventor: Stephen L. Robertson, Surprise, AZ (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

(*) Notice: Subject to any disclaimer, the term of this patent is extended or adjusted under 35 U.S.C. 154(b) by 430 days.

(21) Appl. No.: 18/065,197

(22) Filed: Dec. 13, 2022

(65) Prior Publication Data

US 2024/0190365 A1 Jun. 13, 2024

(51) Int. Cl.
| | |
|---|---|
| *B60R 16/023* | (2006.01) |
| *B60R 16/02* | (2006.01) |
| *H01R 31/06* | (2006.01) |
| *H01R 43/26* | (2006.01) |

(52) U.S. Cl.
CPC ...... *B60R 16/0231* (2013.01); *B60R 16/0207* (2013.01); *H01R 31/065* (2013.01); *H01R 43/26* (2013.01); *H01R 2201/26* (2013.01)

(58) Field of Classification Search
CPC ............ B60R 16/0231; B60R 16/0207; H01R 13/065; H01R 43/26; H01R 2201/26

USPC ........................................................ 439/527
See application file for complete search history.

(56) References Cited

U.S. PATENT DOCUMENTS

| | | | |
|---|---|---|---|
| 8,688,323 B2 | 4/2014 | Aoki | |
| 10,741,979 B2 | 8/2020 | Maki et al. | |
| 2014/0111963 A1 | 4/2014 | Satake et al. | |
| 2018/0069389 A1* | 3/2018 | Ihlenburg | H02H 7/261 |
| 2018/0334117 A1 | 11/2018 | Matsunaga et al. | |
| 2022/0382237 A1* | 12/2022 | Cote | G05B 19/0423 |

FOREIGN PATENT DOCUMENTS

| | | | | |
|---|---|---|---|---|
| CN | 103388534 A | * | 11/2013 | ............. B60R 16/02 |
| CN | 109311437 A | * | 2/2019 | ............. B60R 16/02 |
| CN | 109311439 A | * | 2/2019 | ............. B60R 16/02 |
| CN | 109415026 A | * | 3/2019 | ................ B60L 1/00 |
| CN | 113859149 A | | 12/2021 | |

* cited by examiner

Primary Examiner — Gary F Paumen
(74) Attorney, Agent, or Firm — Dinsmore & Shohl LLP

(57) ABSTRACT

A vehicle electronic system includes a vehicle ECU, a wire harness, and an accessory ECU. The wire harness includes a wire harness connector provided at an end of the wire harness. The accessory ECU includes a wire harness interface, a connection port, and a vehicle ECU interface. The wire harness interface electrically connects to the wire harness connector. The connection port electrically connects to an electronic device. The vehicle ECU interface electrically connects to the vehicle ECU. The accessory ECU is provided between the wire harness connector and the vehicle ECU.

20 Claims, 7 Drawing Sheets

VEHICLES, VEHICLE ELECTRONICS SYSTEMS, AND METHODS

TECHNICAL FIELD

The present specification generally relates to vehicles, vehicle electronic systems, and methods of assembling the same.

BACKGROUND

Many vehicle software systems require dedicated Electronic Control Units ("ECUs") to house the vehicle's software. These ECUs must be connected to the vehicle's electrical system in order to communicate with vehicle sensors and other system ECUs. This is traditionally accomplished by connecting the vehicle ECUs to the vehicle's wire harness.

Many modern vehicles have complex electrical accessories that require their own ECUs to house the accessories' software. This is traditionally accomplished by including additional wires and dedicated connectors to the wire harness so that the accessory ECUs may connect to the wire harness. Because wire harnesses are often standard across a vehicle model, the additional wires and dedicated connectors for any potential accessory is generally incorporated into the vehicle wire harness, which adds cost to the vehicle that may be ultimately be unnecessary if the additional accessories and accessory ECUs are not installed.

SUMMARY

Additional features and advantages of the present disclosure will be set forth in the detailed description, which follows, and in part will be apparent to those skilled in the art from that description or recognized by practicing the embodiments described herein, including the detailed description, which follows the claims, as well as the appended drawings.

In embodiments, a vehicle electronic system includes a vehicle ECU, a wire harness comprising a wire harness connector provided at an end of the wire harness, and an accessory ECU. The accessory ECU includes a wire harness interface electrically connected to the wire harness connector, a connection port electrically connected to an electronic device, and a vehicle ECU interface electrically connected to the vehicle ECU, wherein the accessory ECU is provided between the wire harness connector and the vehicle ECU.

In embodiments, a vehicle includes a vehicle electronic system including a vehicle ECU, a wire harness comprising a wire harness connector provided at an end of the wire harness, and an accessory ECU. The accessory ECU includes a wire harness interface electrically connected to the wire harness connector, a connection port electrically connected to an electronic device, and a vehicle ECU interface electrically connected to the vehicle ECU, wherein the accessory ECU is provided between the wire harness connector and the vehicle ECU.

In embodiments, a method of assembling a vehicle electronic system includes electrically coupling a wire harness interface of an accessory ECU to a wire harness connector or a wire harness. The wire harness connector is provided at an end of the wire harness. The accessory ECU includes the wire harness interface, a connection port electrically connected to an electronic device, and a vehicle ECU interface. The method further includes electrically coupling the vehicle ECU interface of the accessory ECU to a vehicle ECU such that the accessory ECU is provided between the wire harness connector and the vehicle ECU.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description, explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
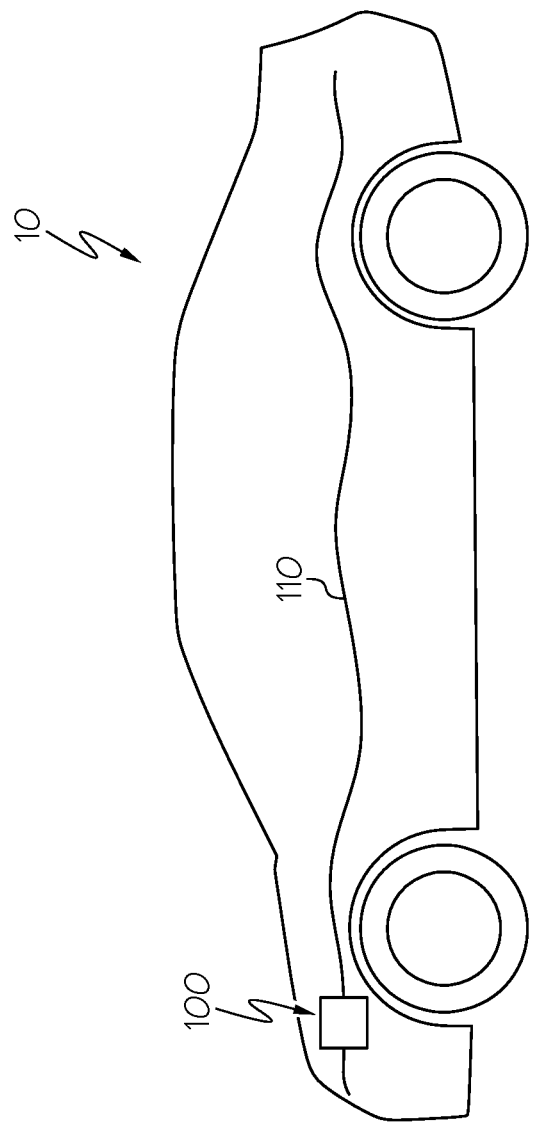
FIG. 1 schematically depicts a vehicle according to one or more embodiments shown and described herein.
Figure 2:
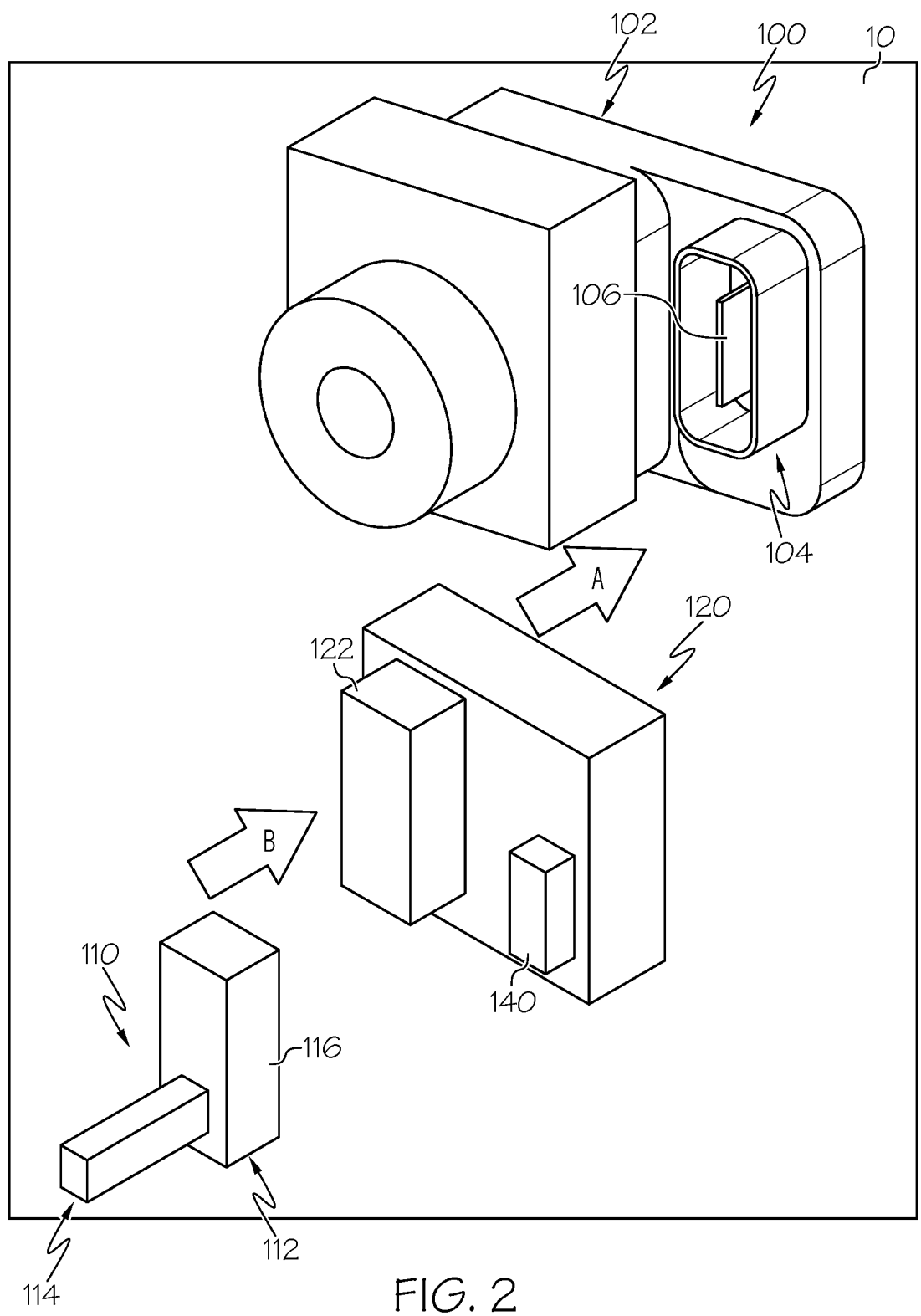
FIG. 2 schematically depicts a diagram of a vehicle electronic system of the vehicle of FIG. 1 according to one or more embodiments shown and described herein.
Figure 3:
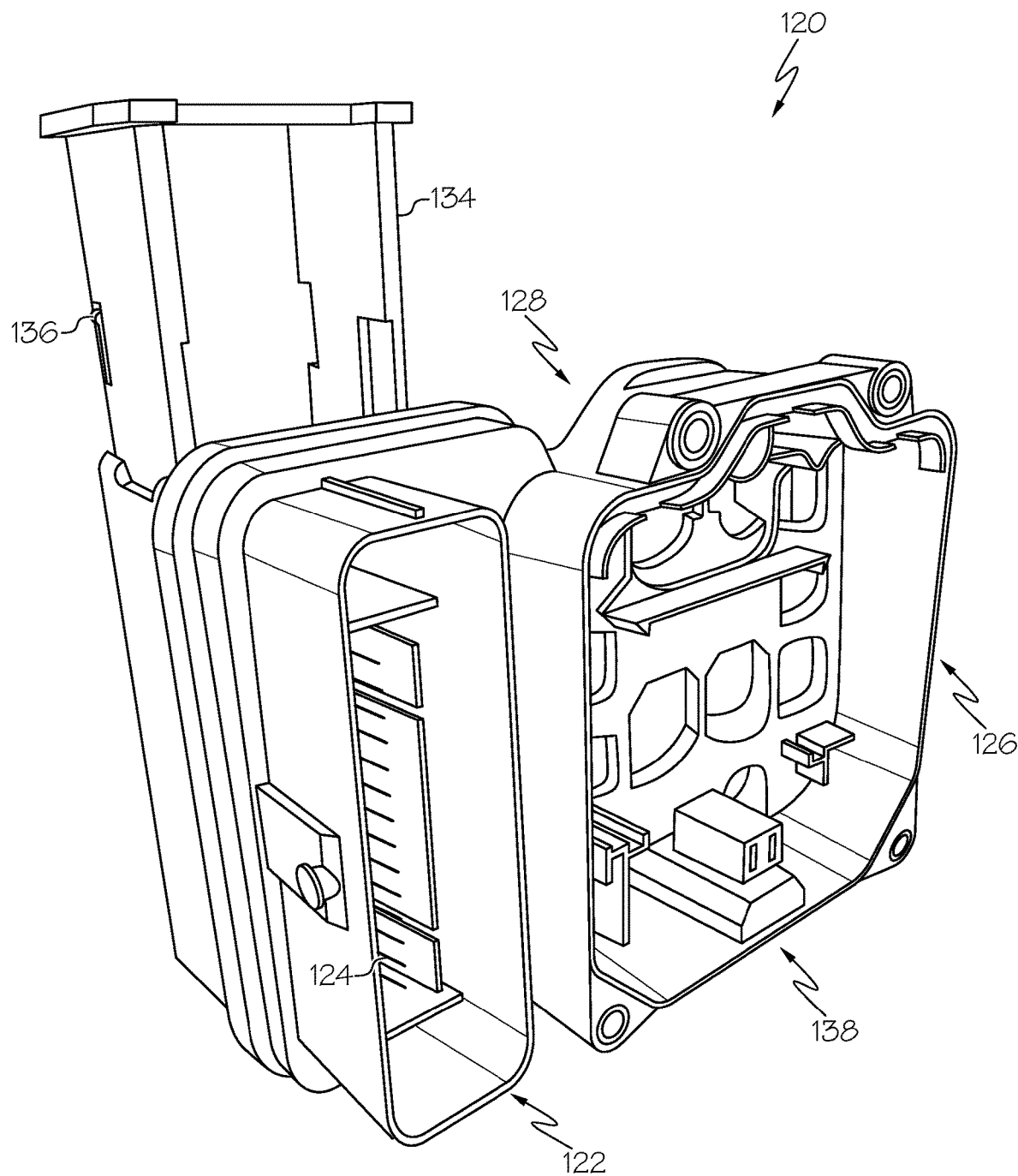
FIG. 3 schematically depicts a front side perspective view of an accessory ECU of the vehicle electronic system of FIG. 2 according to one or more embodiments shown and described herein.

Reference will now be made in detail to various embodiments of devices, assemblies, and methods, examples of which are illustrated in the accompanying drawings. Whenever possible, the same reference numerals will be used throughout the drawings to refer to the same or like parts. FIGS. 1-3 schematically depict a vehicle electronic system. The vehicle electronic system generally includes a vehicle ECU, a wire harness, and an accessory ECU provided between the wire harness and the vehicle ECU. The accessory ECU includes a wire harness interface that may be electrically connected to a wire harness connector of the wire harness, a connection port that may be electrically connected to an electronic device, and a vehicle ECU interface that may be electrically connected to the vehicle ECU. As will be described in greater detail herein, because the accessory ECU is general provided between the wire harness and the vehicle ECU, inclusion of the accessory ECU within the vehicle electronic system may not require a dedicated accessory harness or a dedicated connector. This may enable greater customization of the vehicle electronic system at a lower cost.

Directional terms as used herein—for example up, down, right, left, front, back, top, bottom—are made only with reference to the figures as drawn and are not intended to imply absolute orientation unless otherwise specified.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any device or assembly claim does not actually recite an order or orientation to individual components, or it is not otherwise specifically stated in the claims or description that the steps are to be limited to a specific order, or that a specific order or orientation to components of an device or assembly is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an," and "the" include plural referents unless the context clearly dictates otherwise. Thus, for example, reference to "a" component includes aspects having two or more such components, unless the context clearly indicates otherwise.

Referring to FIGS. 1 and 2, a vehicle electronic system 100 of a vehicle 10 is schematically depicted. The vehicle electronic system 100 may include a vehicle ECU 102. The vehicle ECU 102 may contain a microcontroller and software such that the vehicle ECU 102 may control an electrical system or subsystem of the vehicle 10. In particular, the vehicle ECU 102 may control an electrical system of the vehicle 10 that is related to basic use and/or movement of the vehicle 10. For example, the vehicle ECU 102 may be a vehicle stability control unit, a transmission control module, a speed control unit, or the like. The vehicle ECU 102 may include a vehicle ECU port 104. The vehicle ECU port 104 may be configured to electrically connect to a wire harness, such as a wire harness 110. In particular, the vehicle ECU port 104 may contain a plurality of prongs 106 configured to facilitate electrical connection.

The vehicle electronic system 100 may include the wire harness 110. The wire harness 110 may include an array of wires extending between a first end 112 and a second end 114. The wire harness 110 may be configured to transmit information and electrical power along the array of wires extending between the first end 112 and the second end 114. At the first end 112, the wire harness 110 may include a wire harness connector 116. The wire harness connector 116 may be configured to electrically connect to the vehicle ECU 102. In particular, the wire harness connector 116 may include a plurality of sockets (not depicted) configured to receive the plurality of prongs 106 of the vehicle ECU 102. Accordingly, when the wire harness 110 is coupled to the vehicle ECU 102, the wire harness 110 may transmit information to and from the vehicle ECU 102 and may supply power to the vehicle ECU 102.

Referring to FIG. 2, the vehicle electronic system 100 may include an accessory ECU 120. As depicted, the accessory ECU 120 may be configured as a unitary body. As used herein, "unitary" means unable to separated or spaced apart during operation. As used herein, "unitary" does not necessarily mean monolithic or made of a single material. The accessory ECU 120 may contain a microcontroller and software such that the accessory ECU may control an electrical system or subsystem. In particular, the accessory ECU 120 may control an electrical system of the vehicle 10 that is related to an accessory feature of the vehicle 10. For example, the accessory ECU 120 may control a vehicle detection system, self-driving system, or the like. Accordingly, in some embodiments, the vehicle ECU 102 may control a first subsystem of the vehicle 10 and the accessory ECU 120 may control a second subsystem of the vehicle 10 that is distinct from the first subsystem of the vehicle 10.

Still referring to FIG. 2, the vehicle electronic system 100 may include an electronic device 140. The electronic device 140 may be a light, a camera, a sensor, or other electronic device. In some embodiments, the electronic device 140 may be a set of multiple electronic devices. The electronic device 140 may be coupled to the accessory ECU 120.

The accessory ECU 120 may be coupled to the a vehicle ECU 102 as indicated by a directional arrow A, and the wire harness 110 may be coupled to the accessory ECU 120 as indicated by a directional arrow B. Therefore, the vehicle ECU 102 may be electronically connected to the wire harness 110 via the accessory ECU 120.

Referring now to FIG. 3, the accessory ECU 120 may include various components in embodiments. The accessory ECU 120 may include a wire harness interface 122. The wire harness interface 122 may be provided on a first side 126 of the accessory ECU 120. The wire harness interface 122 may be configured to electrically connect to a wire harness, such as the wire harness 110. In particular, the wire harness interface 122 may contain a plurality of prongs 124 configured to facilitate electrical connection. In embodiments, the arrangement of the plurality of prongs 124 within the wire harness interface 122 may be similar to or substantially the same as the arrangement of the plurality of prongs 106 within the vehicle ECU port 104. Accordingly, in some embodiments, the accessory ECU 120 may electrically connect to a wire harness, such as the wire harness 110, that is configured specifically for connection with the vehicle ECU 102. In other words, the wire harness 110 may be connectable to both the vehicle ECU 102 and the accessory ECU 120 interchangeably.

Still referring to FIG. 3, the accessory ECU 120 may include a connection port 138. The connection port 138 may be configured to electrically connect the electronic device 140 to the accessory ECU 120 via the connection port 138. Accordingly, the accessory ECU 120, which may control an electrical system such as a vehicle detection system, may receive input from the electronic device 140, which may be an associated sensor such as a position sensor. In some embodiments, the connection port 138 may house the electronic device 140 within the accessory ECU 120 or retain the electronic device against the accessory ECU 120. When the electronic device 140 is electrically connected to the connection port 138 of the accessory ECU 120 and when the wire harness 110 is electrically connected to the wire harness interface 122 of the accessory ECU 120, the wire harness 110 may transmit information to and from the electronic device 140 and may supply power to the electronic device 140 via the accessory ECU 120.

Figure 4:
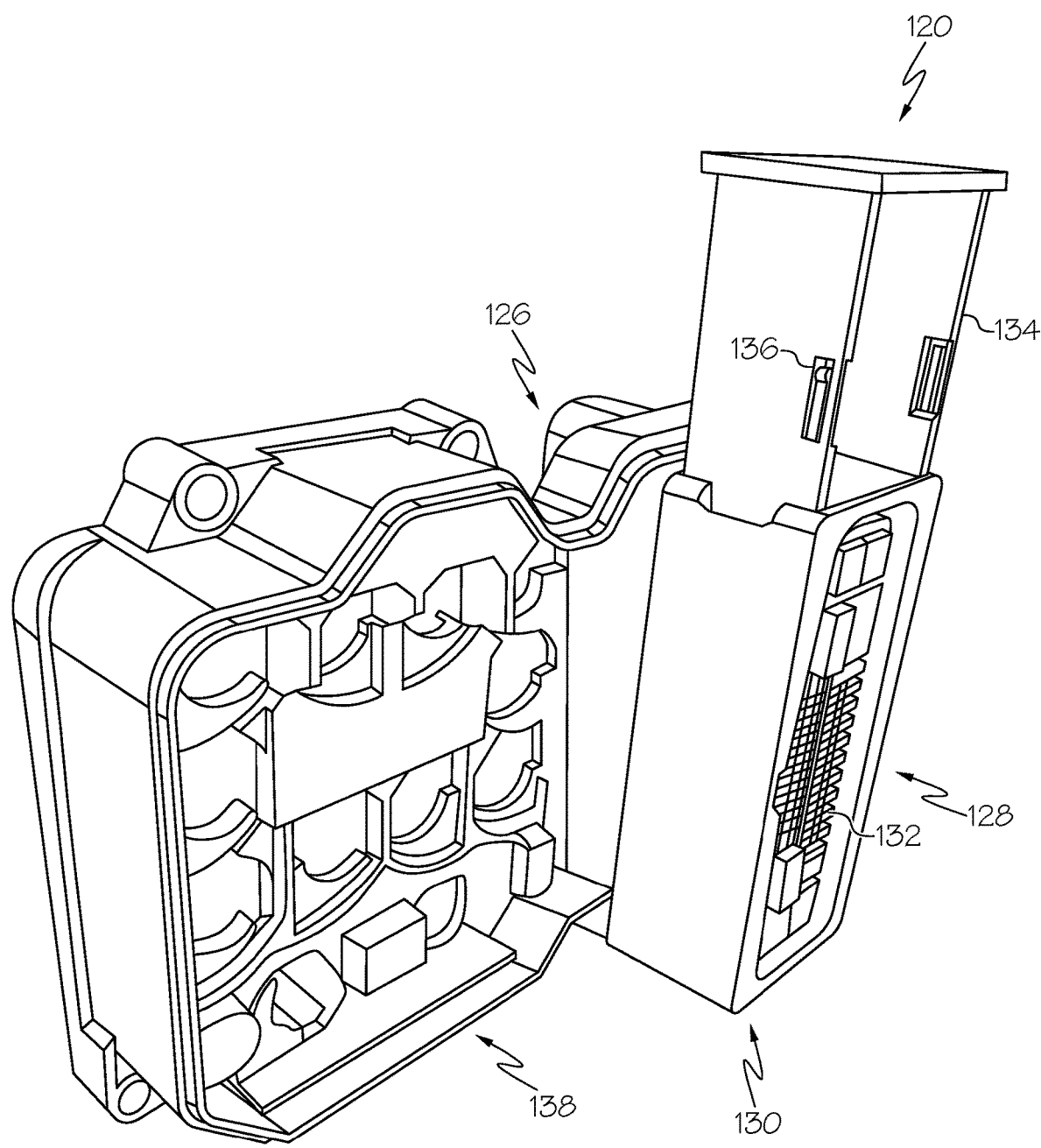
FIG. 4 schematically depicts a rear side perspective view of the accessory ECU of the vehicle electronic system of FIG. 2 according to one or more embodiments shown and described herein.
Figure 5:
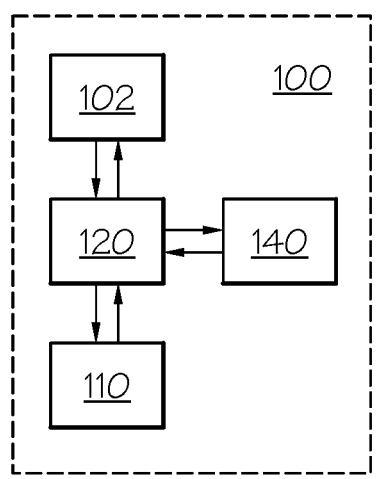
FIG. 5 schematically depicts a block diagram of the vehicle electronic system of FIG. 2 accordingly to one or more embodiments shown and described herein.

Referring now to FIG. 4, the accessory ECU 120 may include a vehicle ECU interface 130. The vehicle ECU interface 130 may be provided on a second side 128 of the accessory ECU 120 opposite the first side 126. Accordingly, the vehicle ECU interface 130 may be opposite the wire harness interface 122. The vehicle ECU interface 130 may be configured to electrically connect to the vehicle ECU 102. In particular, the vehicle ECU interface 130 may include a plurality of sockets 132 configured to receive the plurality of prongs 106 of the vehicle ECU 102. In embodiments, the arrangement of the plurality of sockets 132 within the vehicle ECU interface 130 may be similar to or substantially the same as the arrangement of the plurality of sockets within the wire harness 110. Accordingly, in some embodiments, the accessory ECU 120 may electrically connect to a vehicle ECU, such as the vehicle ECU 102, that is configured specifically for connection with the wire harness 110. In other words, the vehicle ECU 102 may be connectable to both the accessory ECU 120 and the wire harness 110 interchangeably.

Referring now to FIGS. 1-5 in combination, it will now be appreciated that the accessory ECU 120 may be electrically connected to the wire harness 110 at the wire harness interface 122 as indicated by the directional arrow A. The accessory ECU 120 may be electrically connected to the vehicle ECU 102 at the vehicle ECU interface 130 as indicated by the directional arrow B. In other words, a method of assembling the vehicle electronic system 100 may include positioning the accessory ECU 120 on the vehicle ECU 102, as indicated by the directional arrow B, such that the plurality of prongs 106 of the vehicle ECU 102 are assembled within the plurality of sockets 132 of the accessory ECU 120. In a similar manner, the method of assembling the vehicle electronic system 100 may include positioning the wire harness 110 on the accessory ECU 120 at the wire harness interface 122, as indicated by the directional arrow A.

As depicted, after assembly of the vehicle electronic system 100, the accessory ECU 120 may be provided between the vehicle ECU 102 and the wire harness connector 116. More specifically, in some embodiments, the accessory ECU 120 may be directly between the vehicle ECU 102 and the wire harness connector 116. Accordingly, after assembly of the vehicle electronic system 100, the vehicle ECU 102, the accessory ECU 120, and the wire harness 110 may be in electrical communication. In this way, the wire harness 110 may transmit information to and from the vehicle ECU 102 and may supply power to the vehicle ECU 102 via the accessory ECU 120.

In light of FIGS. 1-5, it will now be appreciated that the vehicle ECU 102 may be assembled in direct engagement with the wire harness 110. In embodiments, a method of assembling the vehicle electronic system 100 may therefore include positioning the wire harness 110 on the vehicle ECU 102 such that the plurality of prongs 106 of the vehicle ECU 102 are assembled within the plurality of sockets (not depicted) of the wire harness 110. Accordingly, the wire harness 110 may transmit information to and from the vehicle ECU 102 and may supply power to the vehicle ECU 102 directly. In other words, the vehicle electronic system 100 may be fully functional in terms of the operation of the vehicle ECU 102 whether or not the accessory ECU 120 is provided between the vehicle ECU 102 and the wire harness 110. In embodiments, the vehicle electronic system 100 may be configured to include the accessory ECU 120 without modification of the shape or design of the vehicle ECU 102 or the wire harness 110.

This may be beneficial in some embodiments as it may enable the inclusion or exclusion of the accessory ECU 120 with minor change to the vehicle electronic system 100. In particular, this may enable the inclusion of the accessory ECU 120 within the vehicle electronic system 100 without requiring an additional wire harness or a dedicated connector to transmit information to and from the accessory ECU 120 and to supply power to the accessory ECU 120. This ease of inclusion and exclusion of the accessory ECU 120 and, accordingly, the electronic device 140 without the need of an additional wire harness may enable greater customization of the vehicle electronic system 100 at a lower cost.

Referring to FIG. 4, in embodiments, the accessory ECU 120 may include a locking mechanism 134. The locking mechanism 134 may be configured to retain the vehicle ECU 102 in place when engaged with the accessory ECU 120. In embodiments, the locking mechanism 134 may be vertically slidable, i.e. toward and away from the vehicle ECU interface 130, such as depicted. The locking mechanism 134 may include a snap feature 136 configured to engage with a corresponding depression (not depicted) of the vehicle ECU 102. Accordingly, when the locking mechanism 134 is moved downward, e.g. toward the vehicle ECU interface 130, while the vehicle ECU 102 is engaged with the accessory ECU 120, the snap feature 136 may snap into place within the corresponding depression (not depicted) of the vehicle ECU 102. The vehicle ECU 102 may therefore be retained in engagement with the accessory ECU 120. This may be beneficial in some embodiments as it may decrease the likelihood of unintentional separation of the vehicle ECU 102 from the accessory ECU 120.

Figure 6:
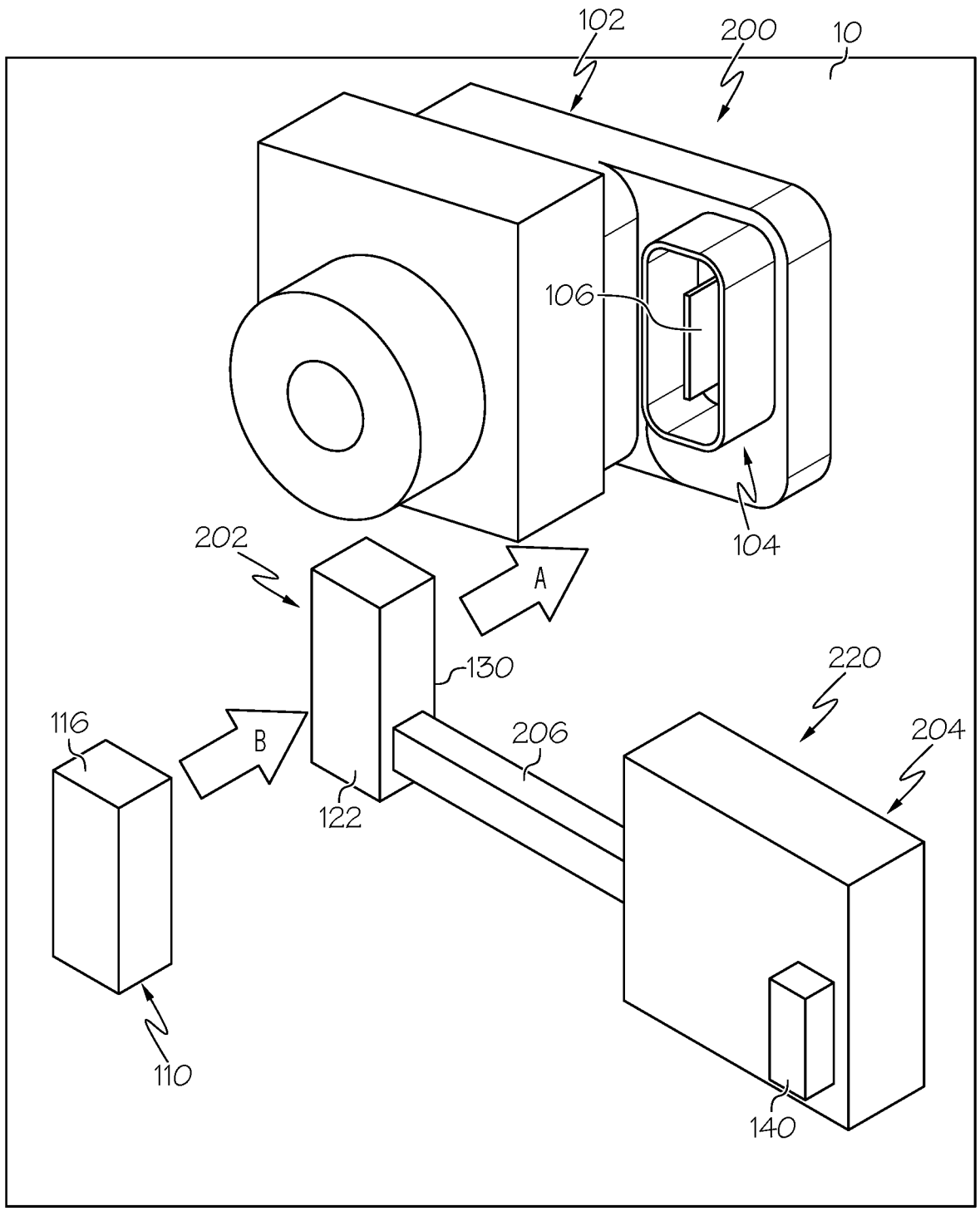
FIG. 6 schematically depicts a diagram of another vehicle electronic system according to one or more embodiments shown and described herein.
Figure 7:
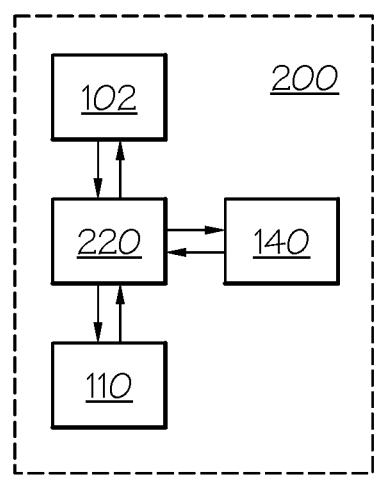
FIG. 7 schematically depicts a block diagram of the vehicle electronic system of FIG. 6 accordingly to one or more embodiments shown and described herein.

Referring now to FIGS. 6 and 7, a vehicle electronic system 200 is schematically depicted. The vehicle electronic system 200 is substantially similar to the vehicle electronic system 100. Accordingly, like numbers will be used to refer to like figures. For example, the vehicle electronic system may include a vehicle ECU 102, a wire harness 110, and an electronic device 140. Disposed directly between the vehicle ECU 102 and the wire harness 110 may be an accessory ECU 220.

The accessory ECU 220 may include a first body 202 and a second body 204 offset from the first body 202. The first body 202 and the second body 204 may be electrically connected via an accessory wire 206. The accessory ECU 220 may include a wire harness interface 122 and a vehicle ECU interface 130 opposite the wire harness interface 122, such as described with respect to the vehicle electronic system 100 hereinabove. The wire harness interface 122 and the vehicle ECU interface 130 may be provided on the first body 202. Accordingly, the first body 202 may be electrically connected to the vehicle ECU 102 via the vehicle ECU interface 130 as indicated by a directional arrow A and may be electrically connected to the wire harness 110 via the wire harness interface 122 as indicated by a directional arrow B.

The accessory ECU 220 may include a connection port 138, such as described in relation to the vehicle electronic system 100 hereinabove. The connection port 138 may be provided on the second body 204. The electronic device 140 may be electrically connected to the second body 204 of the accessory ECU 220 via the connection port 138 and may be electrically connected to the first body 202 of the accessory ECU 220 via the accessory wire 206. This orientation may be beneficial in some embodiments as it may enable the electronic device 140 to be disposed at a distance from the vehicle ECU 102 and the wire harness 110. This may enable the electronic device 140 to be placed at a more beneficial location. For example, in embodiments wherein the electronic device 140 is a position sensor, the electronic device 140 may be placed at a location that is beneficial for sensing the position of a nearby vehicle, e.g. at an exterior of the vehicle 10.

In light of FIGS. 6 and 7, it will now be appreciated that the vehicle ECU 102 may be assembled in direct engagement with the wire harness 110. In other words, the vehicle electronic system 200 may be fully functional in terms of the operation of the vehicle ECU 102 whether or not the accessory ECU 220 is provided between the vehicle ECU 102 and the wire harness 110. Additionally, the vehicle electronic system 200 may be configured to include the accessory ECU 220 without modification of the shape or design of the vehicle ECU 102 or the wire harness 110. This may be beneficial in some embodiments as it may enable the inclusion or exclusion of the accessory ECU 220 with minor change to the vehicle electronic system 200.

In view of the above, it should now be understood that at least some embodiments of the present disclosure are directed to a vehicle electronic system that may generally include a vehicle ECU, a wire harness, and an accessory ECU provided between the wire harness and the vehicle ECU. The accessory ECU may include a wire harness interface that may be electrically connected to a wire harness connector of the wire harness, a connection port that may be electrically connected to an electronic device, and a vehicle ECU interface that may be electrically connected to the vehicle ECU. As described hereinabove, because the accessory ECU may be provided between the wire harness and the vehicle ECU, inclusion of the accessory ECU within the vehicle electronic system may not require a dedicated accessory harness or a dedicated connector. This may enable greater customization of the vehicle electronic system at a lower cost.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle electronic system comprising:
   a vehicle ECU;
   a wire harness comprising a wire harness connector provided at an end of the wire harness; and
   an accessory ECU comprising:
      a wire harness interface electrically connected to the wire harness connector;
      a connection port electrically connected to an electronic device; and
      a vehicle ECU interface electrically connected to the vehicle ECU, wherein the accessory ECU is provided between the wire harness connector and the vehicle ECU.

2. The vehicle electronic system of claim 1, wherein the vehicle ECU is selectively coupleable to both the accessory ECU and the wire harness.

3. The vehicle electronic system of claim 1, wherein the vehicle ECU comprises a plurality of prongs configured to be received within the wire harness.

4. The vehicle electronic system of claim 3, wherein the wire harness interface of the accessory ECU comprises a plurality of prongs having the same orientation as the plurality of prongs of the vehicle ECU.

5. The vehicle electronic system of claim 1, wherein the accessory ECU comprises a first side and a second side opposite the first side, wherein the wire harness interface is provided on the first side and the vehicle ECU interface is provided on the second side.

6. The vehicle electronic system of claim 1, wherein the accessory ECU is a unitary body.

7. The vehicle electronic system of claim 1, wherein the accessory ECU comprises a first body and a second body spaced apart from the first body.

8. The vehicle electronic system of claim 7, wherein the first body is electrically connected to the second body via an accessory wire.

9. The vehicle electronic system of claim 1, wherein the electronic device comprises a sensor.

10. A vehicle comprising a vehicle electronic system, the vehicle electronic system comprising:
    a vehicle ECU;
    a wire harness comprising a wire harness connector provided at an end of the wire harness; and
    an accessory ECU comprising:
       a wire harness interface electrically connected to the wire harness connector;
       a connection port electrically connected to an electronic device; and
       a vehicle ECU interface electrically connected to the vehicle ECU, wherein the accessory ECU is provided between the wire harness connector and the vehicle ECU.

11. The vehicle of claim 10, wherein the vehicle ECU controls a first subsystem of the vehicle, wherein the accessory ECU controls a second subsystem of the vehicle distinct from the first subsystem.

12. The vehicle of claim 10, wherein the accessory ECU is provided directly between the wire harness connector and the vehicle ECU.

13. The vehicle of claim 10, wherein the vehicle ECU is selectively coupleable to the wire harness.

14. The vehicle of claim 10, wherein the accessory ECU is a unitary body.

15. The vehicle of claim 10, wherein the accessory ECU comprises a first body and a second body spaced apart from the first body.

16. The vehicle of claim 10, wherein the accessory ECU comprises a locking mechanism configured to retain the vehicle ECU in engagement with the accessory ECU.

17. A method of assembling a vehicle electronic system comprising:
    electrically coupling a wire harness interface of an accessory ECU to a wire harness connector or a wire harness, wherein the wire harness connector is provided at an end of the wire harness, wherein the accessory ECU comprises:
       the wire harness interface;
       a connection port electrically connected to an electronic device; and
       a vehicle ECU interface; and
    electrically coupling the vehicle ECU interface of the accessory ECU to a vehicle ECU such that the accessory ECU is provided between the wire harness connector and the vehicle ECU.

18. The method of claim 17, wherein the wire harness connector is coupleable to the vehicle ECU.

19. The method of claim 17, wherein the accessory ECU is provided directly between the wire harness connector and the vehicle ECU.

20. The method of claim 17, wherein the accessory ECU comprises a first side and a second side opposite the first side, wherein the wire harness interface is provided on the first side and the vehicle ECU interface is provided on the second side.

\* \* \* \* \*